United States Patent [19]
Gentile et al.

[11] Patent Number: 6,052,800
[45] Date of Patent: Apr. 18, 2000

[54] METHOD AND SYSTEM FOR UPDATING INFORMATION ON AN INTELLIGENT DISPLAY DEVICE MONITORING A COMPUTER SYSTEM

[75] Inventors: Robert Gentile, Beaverton, Oreg.; Eric D. Anderson, Village of North Hudson, Wis.

[73] Assignee: Micron Electronics, Inc., Nampa, Id.

[21] Appl. No.: 09/036,504

[22] Filed: Mar. 6, 1998

[51] Int. Cl.[7] .................................................. G06F 11/00
[52] U.S. Cl. ................................. 714/36; 713/2
[58] Field of Search ................................. 713/1, 2, 100; 714/36, 46

[56] References Cited

U.S. PATENT DOCUMENTS

| | | | |
|---|---|---|---|
| 5,519,832 | 5/1996 | Warchol | 395/183.22 |
| 5,630,048 | 5/1997 | La Joie et al. | 395/183.01 |
| 5,761,505 | 6/1998 | Golson et al. | 395/653 |
| 5,930,503 | 7/1999 | Drees | 395/651 |
| 5,933,594 | 8/1999 | La Joie et al. | 395/183.01 |

OTHER PUBLICATIONS

"Microprocessor System Hardware Monitor", National Semiconductor Product Folder, pp. 1–2, http://www.national.com/pf/LM/LM78.html, (Information as of Jul. 7, 1998) (visited Jul. 8, 1998).

"Microprocessor System Hardware Monitor", National Semiconductor, pp. 1–31, http://www.national.com/ds/LM/LM78.pdf, Mar. 1998, (visited Jul. 8, 1998).

Primary Examiner—Joseph E. Palys
Assistant Examiner—Ronald D. Hartman, Jr.
Attorney, Agent, or Firm—Dorsey & Whitney LLP

[57] ABSTRACT

A system for monitoring a computer system with an external status monitor during the power-on self test (POST) of the computer system. The computer system has tasks to be performed during the POST process. Each task has a token corresponding to an original message or a subsequently added message. Each subsequently added message is stored in the computer system, and each original message is stored in the external status monitor. Under the control of the computer system, the system identifies a task for the computer system to perform. The system then retrieves the token for the identified task and determines whether the retrieved token corresponds to an original message or a subsequently added message. If the retrieved token corresponds to an original message, the system sends only the retrieved token to the external status monitor. If not, the system retrieves the stored message for the retrieved token, notifies the external status monitor that a message will be sent, and sends a token and the retrieved message to the external status monitor. Under the control of the external status monitor, the system receives the token sent from the computer system. When the received token corresponds to an original message, the system retrieves the corresponding message for the received token and displays the retrieved message. When the external status monitor is notified that a new message is being sent, the system receives the message sent from the computer system and displays the received message.

13 Claims, 4 Drawing Sheets

METHOD AND SYSTEM FOR UPDATING INFORMATION ON AN INTELLIGENT DISPLAY DEVICE MONITORING A COMPUTER SYSTEM

TECHNICAL FIELD

The present invention relates generally to monitoring computer systems and in particular to monitoring the boot process of computer systems.

BACKGROUND OF THE INVENTION

Computer systems such as personal computers perform various tasks when the computer system is booted. These tasks may include initialization tasks which initialize various system components to prepare them for use, and diagnostic tests of these and other components to determine that they are functioning correctly. The execution of these tasks is referred to as a power-on self test ("POST"), because the tasks are performed when the computer system is "powered on." When the computer system is powered on, a POST component executes and performs the power-on self testing. The POST component includes various POST tasks, and typically includes a POST engine to invoke the various POST tasks in sequence. Alternately, the tasks can be invoked without the use of a separate POST engine. The tasks are software routines that each perform a specific testing or initialization function. The POST component performs these tasks before the main portion of the operating system is loaded, and thus it often cannot send information to conventional I/O devices such as the display device. If the POST component cannot send information to these I/O devices, then it cannot easily report its progress or status to a user.

Even if the conventional I/O devices are available to report POST status information, they often cannot provide sufficient information. Some users, such as developers, typically need status information about all POST tasks, but conventional I/O devices will often display information related to only a few of the POST tasks. In addition, some conventional I/O devices only display a single line of POST task status information, and such single-line display devices can therefore only display information for the most recent POST task. Moreover, since POST tasks can be performed in a fraction of a second, status information displayed on a single-line display device for one task may be replaced by status information for the next task so quickly that a human observer will not even be able to perceive it. Finally, the POST component typically reports the POST status using tokens. Each POST task is typically associated with a unique token (often a number or byte code) that is associated with a predefined message related to the task. For example, the task of testing memory may have an associated one-byte token with a value of 20 (i.e. binary 0010100) and an associated message such as "POST: Start of First Memory Test." If the conventional I/O device cannot display the message associated with the token, the display of the token itself will not be useful unless an observer knows the predefined message associated with the token.

Some computer systems provide a specialized reporting mechanism is by which the POST component can report its status to a user of the computer system. These computer systems use specialized external status monitors that are attached to the computer system. The external status monitors include an information output device which is typically a display, and are typically connected to the computer systems via a specified I/O port. The external status monitors can also include a read-only memory ("ROM"), a random access memory ("RAM"), and a central processing unit ("CPU"). Using such an external status monitor, a user can view the progress of the computer system POST even though the conventional I/O devices may not be able to display sufficient status information. Since the external status monitors are separate from the computer systems being monitored, they can be initialized and ready to receive information before the POST tasks begin. External status monitors also can have multiple-line displays that can display information about multiple POST tasks at the same time. In addition, the external status monitors can display useful information about each POST task for which status is reported because they receive the predefined tokens that are reported by the POST component and display the predefined message for the token rather than merely the token. For example, when the POST component starts testing memory, the external status monitor can display a message such as "POST: Start of First Memory Test" rather than 20 (or binary 0010100).

To implement the testing and reporting, the POST component maintains a POST Task Table. The POST Task Table contains an entry for each task to be performed, with each entry containing the token for the task and a reference to the routine that performs the task. During the power-on self test, the POST engine retrieves each entry in sequence, invokes the referenced routine, and sends the token to the external status monitor. When the external status monitor receives the token, the external status monitor displays the predefined message to the user. The external status monitor can display these messages because its ROM contains a POST Message Table which maps predefined tokens to text messages which are associated with the task associated with the token. Since the ROM cannot easily be updated once the external status monitor is shipped to a customer as part of a computer system, the POST Message Table reflects tokens that were defined at the time when the ROM was programmed.

Data is typically passed between the computer system CPU and the external status monitor through an I/O port. However, some external status monitors have been designed so that they can use RAM on the computer system or external status monitor, referred to as a POST RAM buffer, to store tokens that are passed. In this situation, the POST component stores the tokens into the POST RAM as it performs the tasks, and the external status monitor retrieves those tokens from the POST RAM. When the POST component starts a new task, it writes the token for that task to the I/O poll assigned to the external status monitor, causing that token to be stored in the next sequential location in the POST RAM. When the external status monitor detects (e.g., by polling) that another token has been stored in the POST RAM, the external status monitor retrieves the message associated with the token from its POST Message Table in ROM. The external status monitor then displays the retrieved message on its display device to apprise the user of the progress of the power-on self test. External status monitors are typically implemented using a microcontroller device that was developed to assist the monitoring of a computer system during the power-on self testing. One such device is the LM78 developed by National Semiconductor, which has a 32-byte POST RAM buffer which can be used to store information sent from the POST component to the external status monitor.

Despite this capability to pass predefined tokens and display predefined messages, the current POST components and external status monitors have serious drawbacks. In particular, only the predefined messages stored in the ROM of the external status monitors can be displayed. If, after the external status monitor ROM is programmed, new POST tasks (with new messages) are added to the POST component or if existing messages are changed, the external status monitor cannot display these new messages. For example, if a new POST task is added to test the level 2 cache, then a new entry in the POST Task Table is added. This new entry would contain a new token associated with the test of the level 2 cache and a reference to the routine to perform that test. However, the POST Message Table of the external status monitor has no message associated with this new token. Thus, the external status monitor could not display a meaningful message indicating that a test of the level 2 cache is being performed. To display a meaningful message, the ROM would need to be updated or replaced so that the POST Message Table contains the new token and new message. Similarly, it may be necessary to change the message for an existing POST task, which would also require a change to the POST Message Table. In either case, it is difficult and expensive to update the POST Message Table. Thus, the external status monitors typically can only display a fixed set of messages that were defined when the POST Message Table was initially generated.

SUMMARY OF THE INVENTION

Some embodiments of the present invention provide a method and system for notifying an external status monitor of the progress of a power-on self test (POST) of a computer system. The computer system has various tasks, including diagnostic testing tasks and initialization tasks, that are to be performed during the POST. Each task has a corresponding token, and each token corresponds to a message. Some messages are defined before the external status monitor was programmed (i.e., an old message), and some are defined after the external status monitor was programmed (i.e., a new message). When a task is to be performed, the system identifies the token for the task and then notifies the external status monitor of the identified token. When the external status monitor receives a token that corresponds to an old message, the external status monitor retrieves the old message from storage and displays the old message. When there is a new message for a token and its corresponding task, the system notifies the external status monitor of the new message. The external status monitor can then receive and display the new message. After notifying the external status monitor, the system performs the task. In this way, the external status monitor can display both old messages and new messages.

DETAILED DESCRIPTION OF THE INVENTION

The present invention provides a method and system for monitoring the power-on self testing (POST) of a computer system in a way that allows new messages to be added without updating an external status monitor. In particular, this extensible system allows the external status monitor to support new messages for both new and existing POST tasks without requiring the external status monitor to be updated at the time the new messages are added. The Extensible POST (E-POST) system of the present invention includes an E-POST component and an Extensible External Status Monitor (EESM). The E-POST system allows new messages to be added to the computer system and reported by the EESM without modification to the POST Message Table in the ROM of the EESM. When the E-POST component encounters a task with a new message, it notifies the EESM that a new message is coming and forwards the new message to the EESM. When the EESM receives the notification, it receives and displays the new message. If, however, the E-POST component encounters a task with an old message, the E-POST component merely forwards the token associated with the task to the EESM. If the EESM receives a token for a predefined message, then it retrieves that message from its POST Message Table and displays the retrieved message. New messages, such as those associated with newly added tasks ("new tasks"), can in this way be defined and displayed without updating the external status monitor, and old messages for originally defined tasks ("old tasks") can be displayed in the same manner as prior external status monitors. Thus, the EESM has the speed advantages of the prior external status monitors when old messages are displayed and the flexibility to support new messages.

Figure 1:
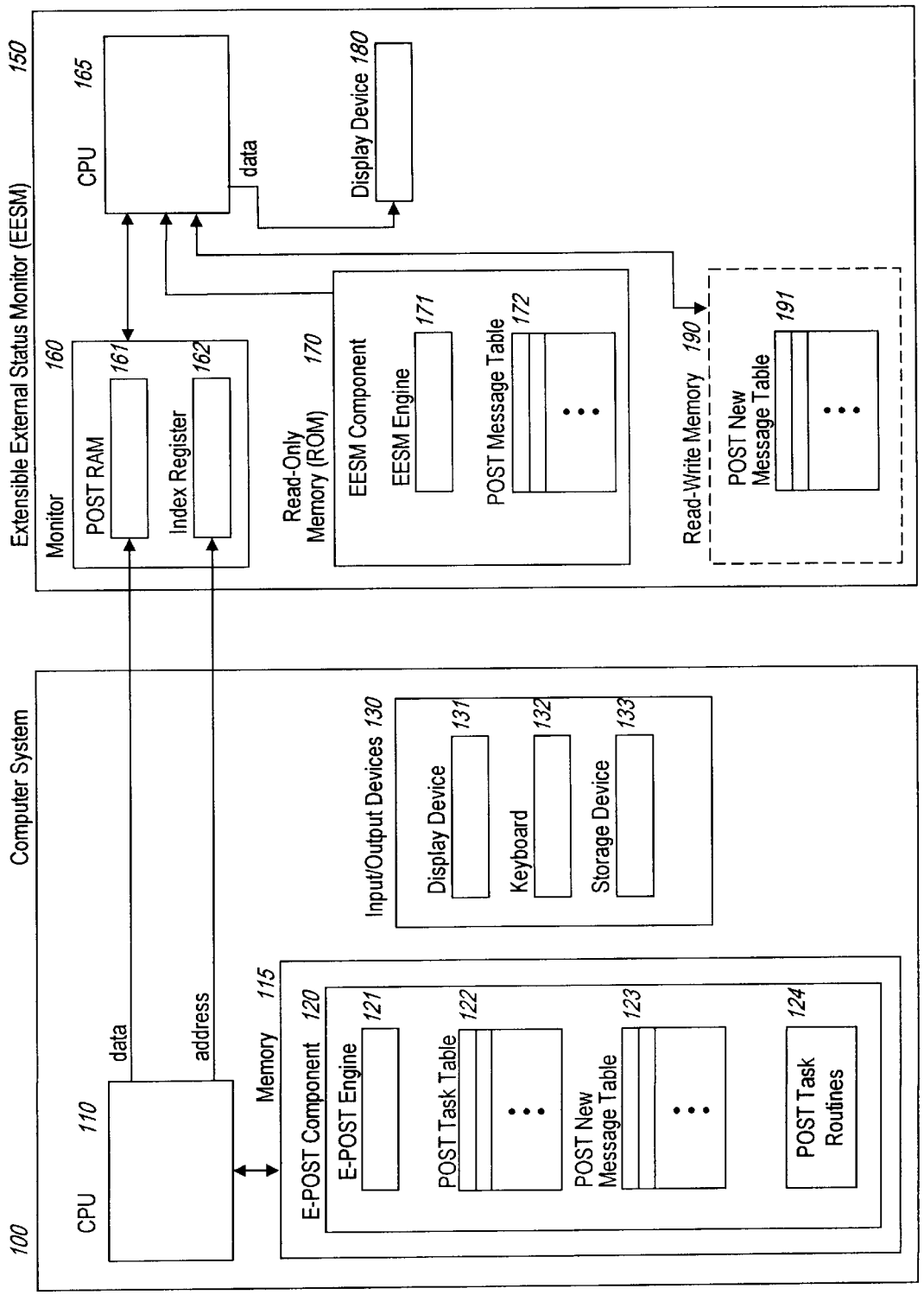
FIG. 1 is a block diagram of the Extensible POST (E-POST) system of the present invention.

FIG. 1 is a block diagram of the E-POST System of the present invention. The computer system 100 includes a CPU 110, a memory 115 containing the E-POST component 120, and input/output devices 130 including display device 131, keyboard 132, and storage device 133. The E-POST system comprises the E-POST component 120 and the Extensible External Status Monitor 150. The E-POST component includes the E-POST engine 121, the POST Task Table 122, the POST New Message Table 123, and POST task routines 124. The POST Task Table contains an entry for each old and new task to be performed during the POST. Each entry contains a unique token for the task and a reference to a routine that performs the task. The POST New Message Table contains an entry for each new message that is associated with a new or old task. Each entry in the POST New Message Table contains the unique token for the task and an associated message to be displayed for that task.

When the developer of the E-POST component adds a new task or associates a new message with an old task, the developer adds an entry to the POST New Message Table. If a new task is being added, then the developer also adds a new entry containing the new token and a reference to the routine for the new task to the POST Task Table. If a new message is being associated with an old task, an old token is already associated with the old task in the POST Task Table. In one embodiment, the old token remains associated with the old task (and is thus used in the POST New Message Table entry for the new message). In another embodiment, the developer overwrites the old token in the POST Task Table entry for the old task with a new token, thus associating the new token with the old task, and uses the new token in the POST New Message Table entry. In either case, the unique token that is associated with a task in the POST Task Table will be the same token used in the POST New Message Table with a new task message.

As the E-POST engine performs a task indicated in the POST Task Table, the E-POST engine determines whether the task has a new message. If so, then the E-POST engine indicates to the EESM that a new message exists, and sends a token and the new message from the POST New Message Table entry for that task to the EESM. If the token is a new token, then the E-POST engine can indicate a new message merely by sending the new token (i.e., the EESM can recognize that the token is new). If the token is old (i.e. the old token has not been replaced with a new token), then the E-POST engine signals the EESM that a new message has been associated with an old token. For example, the E-POST engine can set a flag that signals the EESM, or can send a 'new message' token in place of the old token (if the 'new message' token has been previously defined to indicate that a new message will follow). On the other hand, if the task has an old message then the E-POST engine sends only the old token from the POST Task Table to the EESM. The E-POST engine can determine whether a task has a new message by checking the POST New Message Table, and can determine whether a token is old or new in various ways. For example, a POST Task Table entry could include a flag that indicated if a token is new (that would be set when an entry in the table was added or the token was modified). Alternatively, the developer could assign byte codes to new tokens that are distinguishable from the byte codes of old tokens.

The EESM 150 includes the monitor 160, a CPU 165, a ROM 170, a display device 180, and an optional read-write memory 190. The monitor comprises the POST RAM 161 and index register 162. The ROM contains the EESM component, which includes the EESM Engine 171 and the POST Message Table 172. The POST Message Table contains an entry for each old token defined by the E-POST system, with each entry containing an old token and an associated old message. When the EESM engine receives a token in the POST RAM from the E-POST engine, the EESM engine first determines whether a new message will also be sent by the E-POST engine. This may be determined in a variety of ways. For example, the E-POST engine could send a message notification flag along with the token when a new message is being sent, or the token itself could indicate that a new message is being sent (e.g., the token could be a previously defined 'new message' token, or the absence of the token in the POST Message Table 172 could indicate that the token was new and a new message was being sent). If it is determined that a new message is not being sent, then the token is considered to be an old token. In this situation, the EESM engine retrieves the message from the POST Message Table that is associated with the old token, and displays the message on the display device. If it is determined that a new message is being sent, then the EESM engine receives the message sent by the E-POST engine and displays that message on the display device. If the EESM contains an optional read-write memory and the EESM engine has received a new unique token, the EESM engine can dynamically create a POST New Message Table 191 by storing the new token and new message together. On subsequent performances of that task, the EESM engine can determine that the received new token is in the POST New Message Table and can retrieve the stored message from there rather than receiving the message from the E-POST engine. If the E-POST engine is aware that the EESM engine contains such a POST New Message Table (e.g., through prior knowledge of the EESM engine's capabilities or through notification from the EESM engine), then the E-POST engine need only send a new message to the EESM engine once. Those skilled in the art will appreciate that the monitor 160 could physically reside either on the EESM 150 or on the computer system 100.

Figure 2:
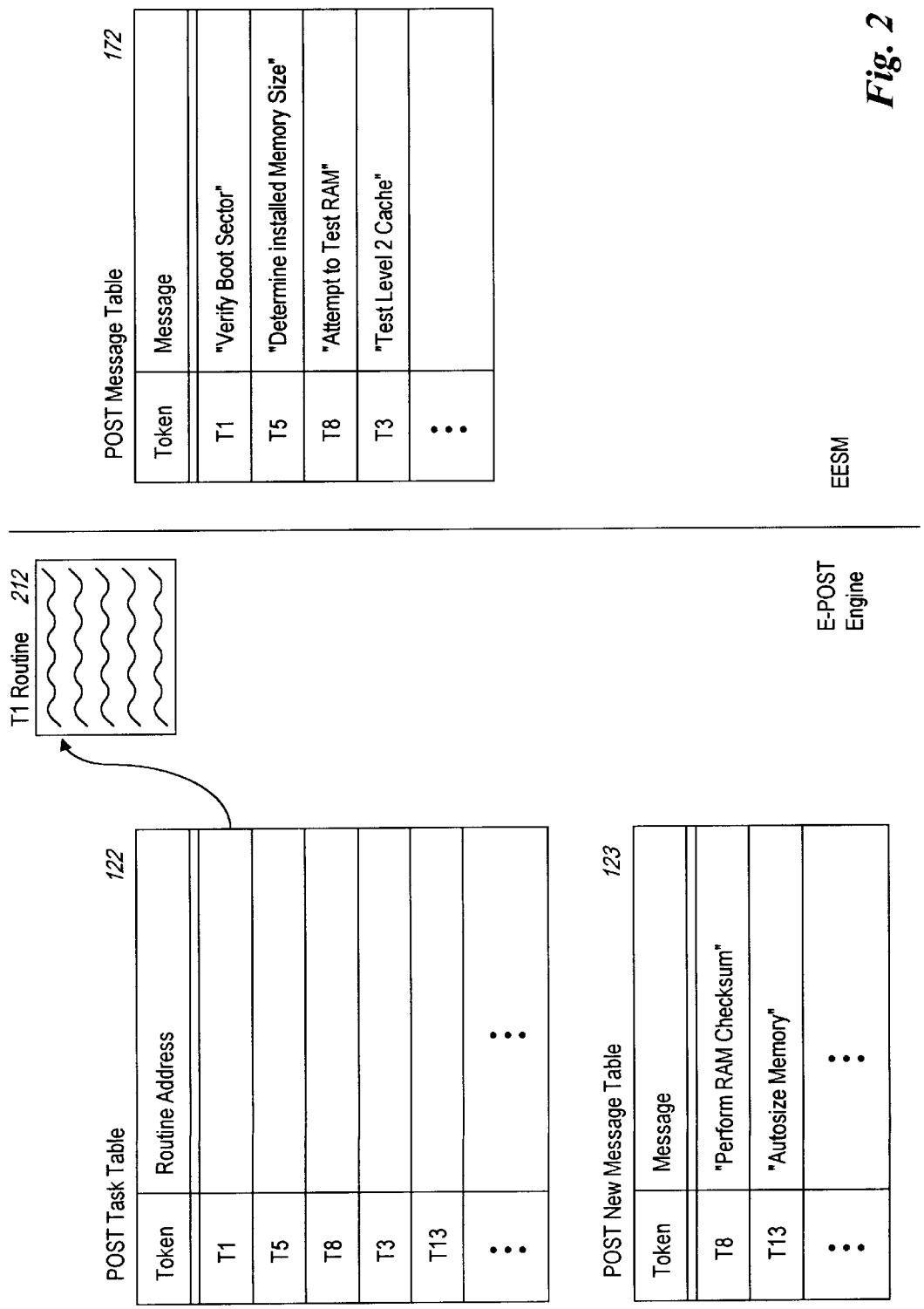
FIG. 2 is a block diagram illustrating example contents of the various tables of the E-POST component and the Extensible External Status Monitor (EESM) component.

FIG. 2 is a block diagram illustrating example contents of the various tables of the E-POST component and the EESM component. As shown, the POST Task Table 122 contains entries for five tasks. The tasks associated with tokens T1, T3, and T5 are old tasks with old messages, and the task associated with token T13 is a new task with a new message. The task that is associated with token T8 is an old task that now has a new message. In addition, the POST Task Table illustrates that the entry for each task includes a reference to a routine that is invoked to perform the task, such as the T1 routine 212. The POST Message Table 172 of the EESM contains an entry for each old message, identified by the old tokens T1, T3, T5, and T8. When the task associated with token T13 was added to the E-POST component, the developer of the E-POST system added a new entry to the POST Task Table and to the POST New Message Table 123. When a new message was added to the E-POST component for the task associated with token T8, the developer added a new entry to the POST New Message Table along with the token associated with the task, token T8. In an alternate embodiment, the developer could have instead modified the existing task entry in the POST Task Table to change the token from T8 to some new unique token such as T20, and used the new token in the new POST New Message Table entry. In either embodiment, the POST New Message Table thus contains an entry for each new message and its associated token. When the developer added entries to or modified the POST Task Table and POST New Message Table, the developer did not need to update the POST Message Table of the EESM to reflect the changes made to the E-POST component. Instead, whenever the E-POST component performs a task with a new message, the E-POST engine indicates that a new message will be sent, and then sends the new message from the POST New Message Table to the EESM. The E-POST engine can indicate that a new message will be sent in a variety of ways. For a new token such as T13, sending the token can be a sufficient indication since the EESM can recognize that token T13 is new. For an old token with a new message such as T8, the E-POST engine can send the old token as before and indicate a new message through the use of a flag, can substitute a predefined 'new message' token (e.g., T00) for old token T8 when it is sent to the EESM, or can send both the old token and a 'new message' token. If the EESM receives a new token such as T13, the EESM recognizes that a message corresponding to that token is not in its POST Message Table and that a new message will be sent. Alternately, if the EESM receives a new message indication through a flag or receives a 'new message' token, the EESM knows that a new message will be sent. When the EESM system is alerted to the existence of a new message, it then receives the message sent by the E-POST engine (e.g., "Perform RAM checksum" or "Autosize Memory") and displays that message.

Figure 3:
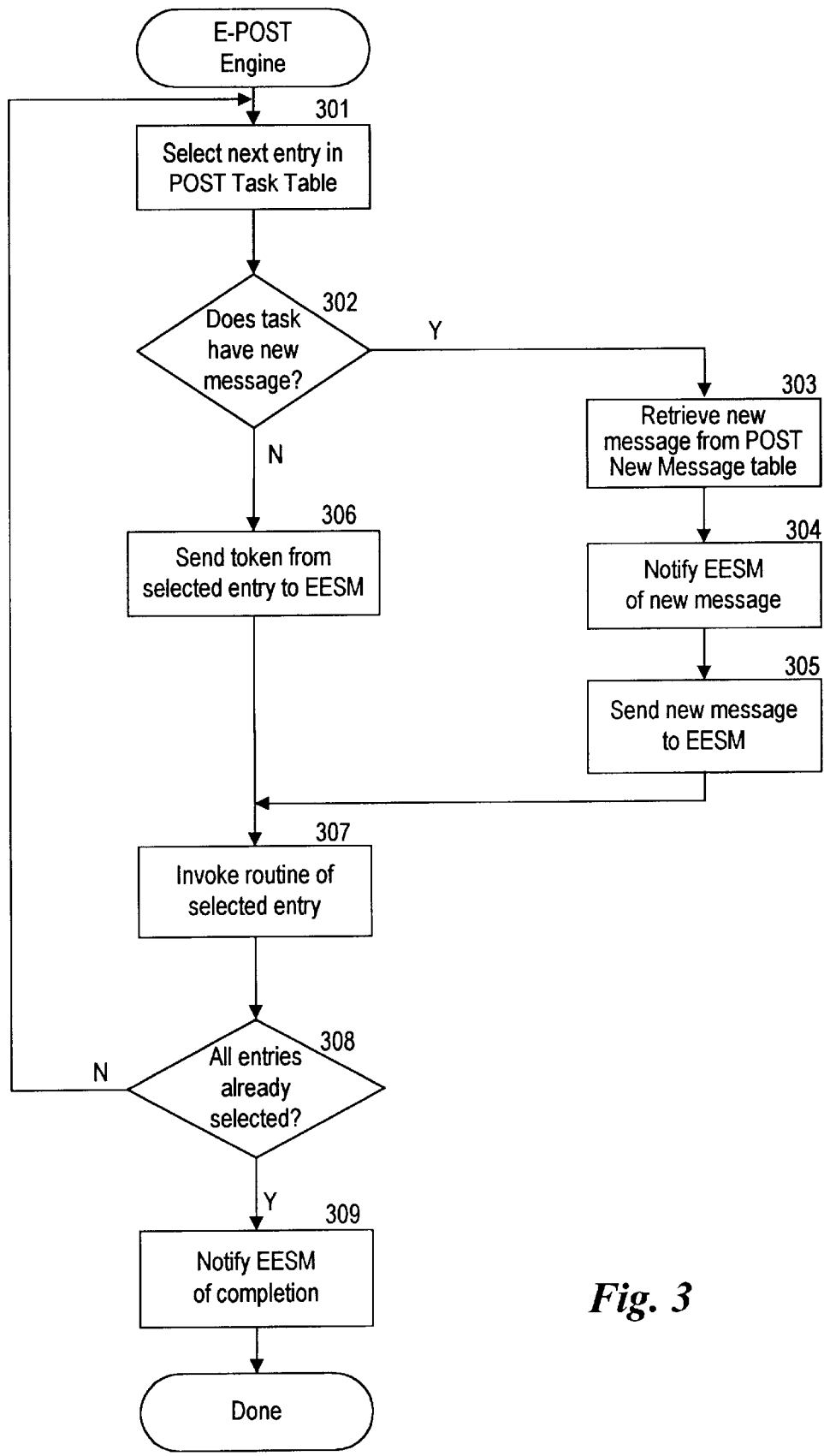
FIG. 3 is a flow diagram of an implementation of the E-POST engine.

FIG. 3 is a flow diagram of an implementation of the E-POST engine. The E-POST engine loops retrieving each entry from the POST Task Table and invoking the routine identified by that entry. The E-POST engine also sends the token associated with the task in the retrieved table entry to the EESM. If the task has a new message, then the E-POST engine retrieves the associated message from the POST New Message Table and sends that message to the EESM. In steps 301–308, the engine loops selecting and processing the entries from the POST Task Table. In step 301, the engine selects the next entry from the POST Task Table, starting with the first entry. In step 302, if the task of the selected entry has a new message, then the engine continues at step 303, else the engine continues at step 306. In step 303, the engine retrieves the entry from the POST New Message Table associated with the token from the selected entry (i.e.

that is associated with the selected task). In step 304, the engine notifies the EESM that a new message will be sent. This can be accomplished by sending the new token or a 'new message' token to the EESM, or by notifying the EESM such as through the use of a flag. In step 305, the engine sends the new message from the retrieved POST New Message Table entry to the EESM. In step 306, the engine sends the token from the selected POST Task Table entry to the EESM. In step 307, the engine executes the routine associated with the selected POST Task Table entry. In step 308, if all the POST tasks have already been selected from the POST Task Table, then the engine continues at step 309, and otherwise the engine loops to step 301 to select the next entry in the POST Task Table. In step 309, the engine sends to the EESM an indication that the power-on self test is complete and the engine completes.

Figure 4:
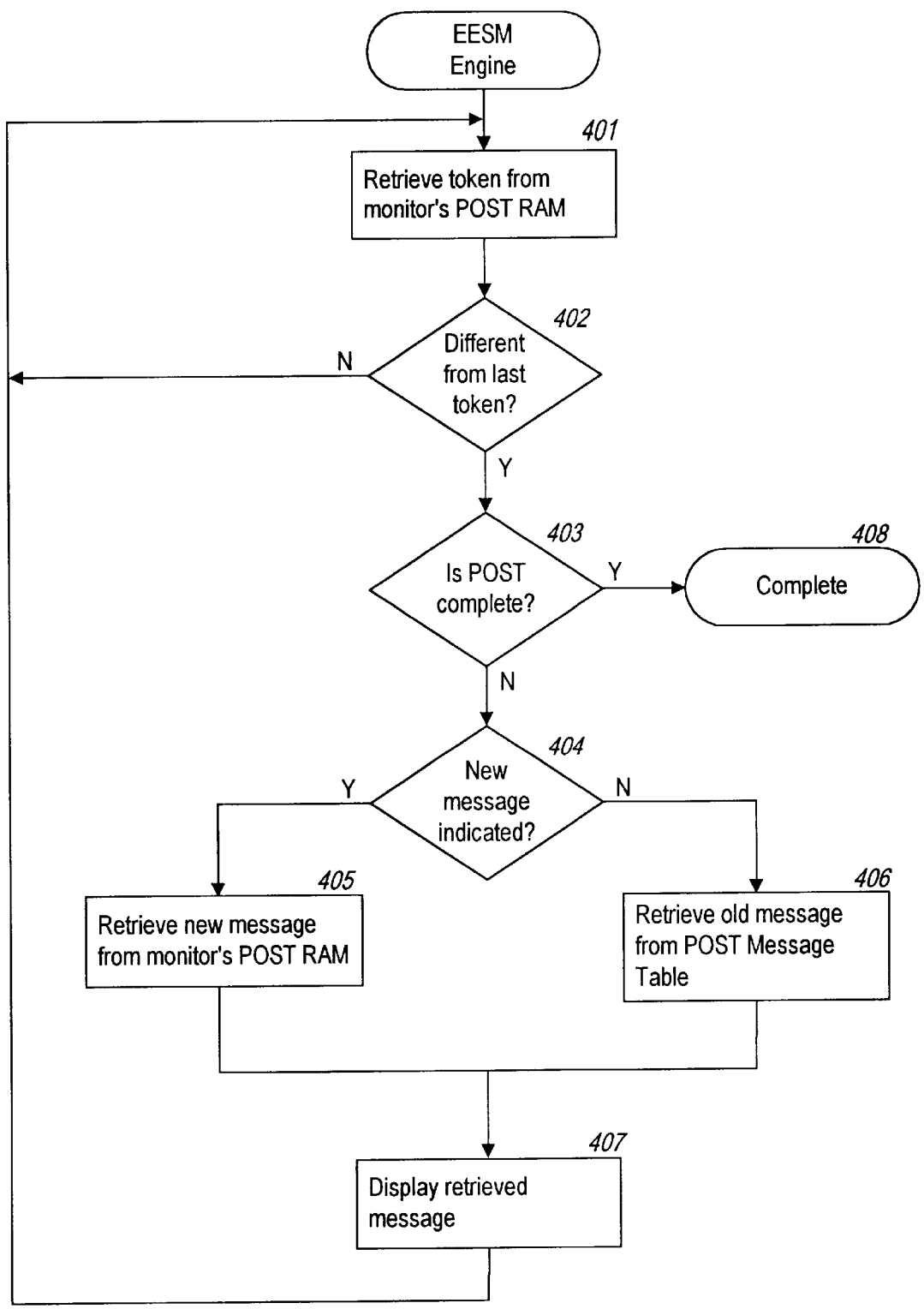
FIG. 4 is a flow diagram of an implementation of the EESM engine.

FIG. 4 is a flow diagram of an implementation of the EESM engine. The engine loops retrieving tokens sent by the E-POST engine. If a retrieved token is a new token or if the EESM engine is notified that a new message is being sent, then the engine also retrieves the new message sent by the E-POST engine that follows the token. If the token is not a new token and there is no message notification, then the engine retrieves the old message associated with the token from the POST Message Table. The engine then displays on the display device either the message from the E-POST engine or from the POST Message Table. The EESM engine can determine that a new message will follow a token in a variety of ways. In one embodiment, all tokens that are sent are old tokens, but old tokens with new messages are accompanied by a flag indicating the presence of the new message and the new message follows the token and flag. In an alternate embodiment, an old token with a new message is not sent to the EESM, but instead a predefined 'new message' token is sent to indicate that a new message is following the token, and the EESM engine determines if the retrieved token is the predefined token. In still another embodiment, old tokens with new messages are replaced with new tokens, the new tokens and the new messages are sent to the EESM engine, and the engine recognizes new tokens by comparing the retrieved token to those in the POST Message Table and considering a token to be new if it is not in the table.

In steps 401–407, the engine loops processing each of the received tokens. In step 401, the engine retrieves the last token sent by the E-POST engine by polling the POST RAM. In step 402, if the retrieved token is not the same as the previously retrieved token, then the engine continues at step 403, else the engine loops back to step 401 to continue polling. In step 403, if the retrieved POST token indicates that the power-on self test is complete, then the engine completes at step 408, else the engine continues at step 404. In step 404, if the EESM receives an indication that a new message is being sent, then the engine continues at step 405, else the engine continues at step 406. In step 405, the engine retrieves the message sent by the E-POST engine. In step 406, the engine retrieves the message associated with the retrieved token from the POST Message Table. In step 407, the engine displays the retrieved message on the display device and loops to step 401 to continue polling. If the EESM contains the optional read-write memory with a POST New Message Table, the engine can optionally include the additional steps (not shown) of associating a message retrieved in step 405 with the last token retrieved in step 401, and storing the token and message in the POST New Message Table.

In one embodiment, the E-POST system uses the monitor 160 in a way that solves a problem encountered by some prior POST systems. The monitor includes the POST RAM and the index register. The POST RAM typically contains a limited amount of RAM, and the index register contains a value that provides an index into the POST RAM. For example, the LM78 contains 32 bytes of RAM and the index register contains a value between 0 and 31. Under the normal operation of most prior POST components, the POST components write tokens associated with the tasks being performed during the power-on self test to a specified I/O port, such as I/O port address 80h. The monitor captures the tokens written to the specified I/O port, and writes the tokens to sequential locations in the POST RAM. If the POST RAM has 32 bytes, then it can only store the first 32 1-byte tokens. Thus, such a prior POST component can only display messages for the first 32 tokens sent. The E-POST system uses the monitor in a way that allows an unlimited number of tokens to be sent to and received by the EESM and that allows new messages to be sent to the EESM. To accomplish this use, the E-POST component sets the value in the index register to point to a desired location (e.g., location 0) of the POST RAM. The E-POST component then writes the new token followed by the new message to the I/O port. As each byte of data is stored in the POST RAM, the index register is automatically incremented to point to the next location. Thus, the POST RAM will contain the new token followed by the new message in sequential locations. Those skilled in the art will appreciate that other methods of sending tokens and messages are possible, and that other monitors may include different functionality.

It is additionally possible for an E-POST engine to follow a procedure that allows it to function with both the EESM and prior external status monitors. The EESMs recognize two additional ports through which the E-POST can control the index register and store data in the POST RAM. Before each token is sent, the E-POST engine attempts to reset the index register to point to location 0 using one of the additional ports. The E-POST engine then writes the token to the byte indicated by the index register by writing to the other additional port. If the message is new, then the E-POST engine writes the message. Since prior external status monitors do not recognize those additional ports, they will ignore the data that supports the EESMs. The E-POST engine can also write the token to the specified I/O port that is supported by prior external status monitors. If an EESM is present, it will ignore the token written to the specified I/O port, and the EESM's functions will not be affected. If a prior external status monitor is instead present, it will ignore the initial token and message that are written, and will instead recognize only the token written to the specified I/O port. In this way, the E-POST engine can communicate with either EESMs or prior external status monitors.

From the foregoing it will be appreciated that, although specific embodiments of the invention have been described herein for purposes of illustration, various modifications may be made without deviating from the spirit and scope of the invention. For example, if the POST Message Table is stored in a programmable read-only memory, then the EESM component can store a new message directly in the POST Message Table. Moreover, if the E-POST component tracks whether a new token along with a new message has already been sent to the EESM, then the E-POST component could avoid resending the new message on subsequent booting of the computer system. Accordingly, the invention is not limited except as by the appended claims.

What is claimed is:

1. A method for monitoring a computer system with an external status monitor during booting of the computer system, the computer system having tasks to be performed during booting, each task having a message token corresponding to a message, each message being an original message or a subsequently added message, each subsequently added message being stored in the computer system, the external status monitor storing the message token and corresponding message for each original message, the method comprising:

under the control of the computer system,
identifying a task for the computer system to perform;
retrieving the message token for the identified task;
determining whether the retrieved message token corresponds to an original message or a subsequently added message;
when the retrieved message token corresponds to an original message, sending the retrieved message token to the external status monitor;
when the retrieved message token corresponds to a subsequently added message,
sending the retrieved message token to the external status monitor;
retrieving the stored message for the retrieved message token; and
sending the retrieved message to the external status monitor; and
performing the identified task on the computer system; and under the control of the external status monitor,
receiving the message token sent from the computer system;
determining whether the received message token corresponds to an original message or a subsequently added message;
when the received message token corresponds to an original message,
retrieving the corresponding message for the received message token; and
displaying the retrieved message; and
when the received message token corresponds to a subsequently added message,
receiving the message sent from the computer system; and
displaying the received message at the external status monitor.

2. The method of claim 1 wherein the external status monitor has writable memory, and including:
under the control of the external status monitor,
when the received message corresponds to a subsequently added message, storing the received message token in correspondence with the received message in the writable memory.

3. The method of claim 2 including:
under the control of the computer system,
after sending the retrieved message to the external status monitor,
designating the message corresponding to the retrieved message token to be an original message so that future determinations of whether the retrieved message token corresponds to an original message or a subsequently added message will determine that the message corresponding to the retrieved message token is an original message.

4. A method in an extensible external status monitor for monitoring a computer system, the external status monitor having a plurality of tokens, each token having a corresponding message, the method comprising:

receiving a token sent by the computer system;
when the external status monitor has a message corresponding to the received token,
retrieving the message corresponding to the received token; and
displaying the retrieved message; and
when the external status monitor has no message corresponding to the received token,
receiving a message sent by the computer system; and
displaying the received message.

5. The method of claim 4 wherein the received token is sent by the computer system during a power-on self test and is associated with a task on the computer system, wherein the retrieved and received messages are text messages, and wherein displaying a message indicates performance of the task associated with the received token.

6. The method of claim 4 wherein the external status monitor has writable memory and after receiving the message sent by the computer system, storing the received token at the external status monitor in the writable memory in correspondence with the received message.

7. The method of claim 4 wherein a message is sent by the computer system only if the computer system determines that the external status monitor has no message corresponding to the token sent by the computer system.

8. The method of claim 4 wherein the received token corresponds to a diagnostic task performed during power-on self test.

9. An external status monitor for monitoring a power-on self test of a computer system, comprising:
a plurality of predefined tokens, each token having a corresponding message;
a receiving component for receiving a token sent by the computer system; and
a message processing component that,
when the received token is one of the plurality of predefined tokens, retrieves the message corresponding to the received token and displays the retrieved message at the external status monitor; and
when the received token is not one of the plurality of predefined tokens, receives a message sent by the computer system and displays the received message at the external status monitor.

10. The external status monitor of claim 9 wherein the received token is associated with a task on the computer system, and wherein the displaying of a message at the external status monitor indicates the performance of the task associated with the received token.

11. The external status monitor of claim 9 including
a writable memory; and
a storage component that, after receiving the message sent by the computer system, stores the received token in correspondence with the received message in the writable memory.

12. The external status monitor of claim 9 wherein a message is sent by the computer system only if the computer system determines that the external status monitor has no message corresponding to the token to be sent.

13. The external status monitor of claim 9 wherein the received token corresponds to a diagnostic task performed during power-on self test.

* * * * *